April 2, 1940.      F. A. PARSONS      2,195,799

BACKLASH ELIMINATOR

Filed March 10, 1939

INVENTOR
Fred G Parsons

Patented Apr. 2, 1940

2,195,799

UNITED STATES PATENT OFFICE 2,195,799

BACKLASH ELIMINATOR

Fred A. Parsons, Milwaukee, Wis., assignor to Kearney & Trecker Corporation, West Allis, Wis., a corporation of Wisconsin Application March 10, 1939, Serial No. 260,983

16 Claims. (Cl. 74—441)

This invention relates to backlash elimination and more particularly of a type which can be advantageously used for automatically eliminating the lost motion in drives for relative movement of machine tool cutter and work supports, and the like.

Machine tool supports are frequently moved by mechanical means as, for example, screw and nut means which require a certain amount of running clearance or backlash, partly by reason of unavoidable variations in the pitch diameter or lead at various axial points of the screw. Even a small amount of such clearance causes difficulties and inaccuracy as by chatter or vibration between the parts and when the machine is of the type in which so-called climb cutting is performed, as for example in a milling machine, any material backlash may operate in a manner well understood in the art to damage or break the machine, the work or the cutter. It is highly desirable to eliminate all clearance or lost motion which might result in backlash, both between the screw and its nut and also between the nut and the support.

Most or all of the machines where it is desirable to eliminate backlash during the cutting movements have, in addition to the cutting movements, relatively very rapid idle or quick traverse movements. It is desirable that any means for elimination of backlash should operate without setting up undue friction in any event but this is particularly true when starting a quick traverse movement, because not sufficient power is ordinarily available for starting a high load at a high traverse speed. Nevertheless, the backlash elimination, to be fully effective should be operative before the cutting feed is engaged as, for example, before effecting a change from a forward quick traverse to a forward feed rate, particularly for climb cutting. It is also desirable that there should be no undue friction during hand operation of the supports.

A purpose of the invention is to provide backlash elimination means of improved form, particularly for screw and nut means.

A further purpose is to provide improved backlash eliminating means in a form particularly adapted for the drive of support movements, particularly of machine tools.

A further purpose is to provide an improved backlash eliminator which will operate without setting up undue frictional resistance to the relative movement of the parts between which it operates.

Another purpose is to provide an improved backlash eliminator for machine tool supports which operates effectively under all cutting conditions, while avoiding the necessity for interlocks for unloading or relieving the pressure or friction of the backlash eliminator device during other conditions of operation, and still other objects will be apparent from what follows.

The invention comprises the construction and combination of parts herein illustrated, described and claimed and, since modifications are contemplated, also includes such modifications as are equivalent to the structure of the claims.

The same parts have been identified by the same reference characters throughout, and in the drawing.

Figures 1, 2, 3:
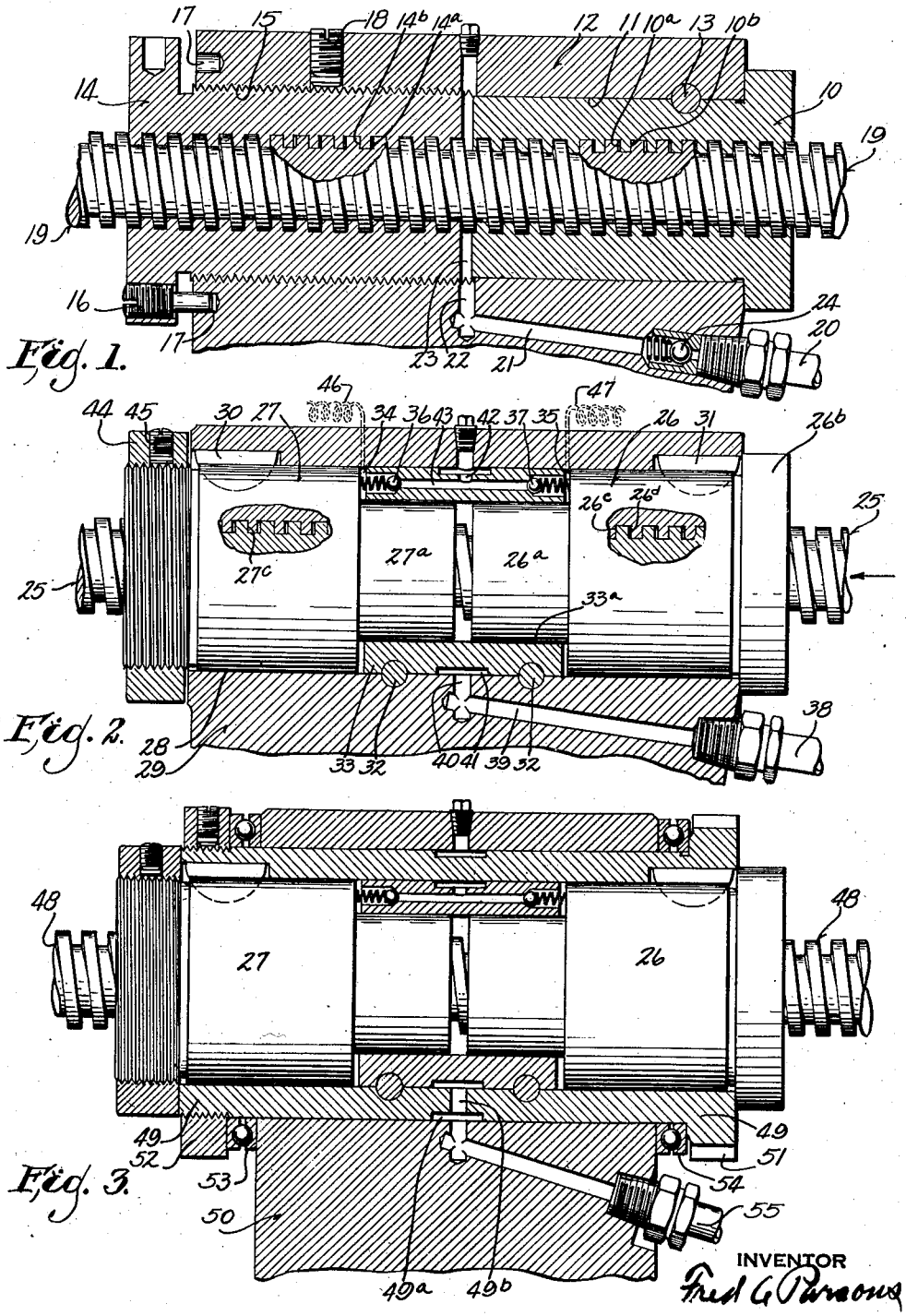
Fig. 1 shows nut and rotary screw means to which the invention has been applied in one of its simpler aspects.
Fig. 2 shows another form of the invention, also in connection with a nut and rotary screw.
Fig. 3 shows the invention in connection with a rotary nut and stationary screw device, being otherwise similar to Fig. 2.

In the device of Fig. 1 a nut portion 10 is fixed in a bore 11 of a support 12 by the means of a locking pin 13. Another nut portion 14 is relatively adjustable in the threaded bore 15, there being a pilot screw 16 adapted to engage any of several arcuately closely spaced configurations, such as 17, 17, and a clamp screw 18. A feed screw 19 engages both of the nut portions 10, 14, and the nut portion 14 may be rotated to draw the feed screw to the left in Fig. 1 against the abutment offered by the engaging threads of the nut portion 10, and the nut portion 14 then locked in such position that there is a slight clearance forming a helical groove at the left of the screw abutment portions of the nut portion 10, as at 10a, and a slight clearance forming a helical groove at the right of the screw abutment portions of the nut portion 14, as at 14a. It will be understood that the actual clearances at 10a and 14a are much enlarged in the drawing. There will also be a very slight clearance forming very small helical grooves in each of the nut portions at the other side of the abutment. This is too small to be shown in the drawing, but is indicated at 10b and 14b, being the running clearance which, as will be understood, is unavoidable where a screw is to turn in a nut.

Liquid, such for example as lubricating oil, from a suitable pressure source, is continuously supplied to the space between the inner adjacent ends of the nut portions 10, 14 through a pipe channel 20 and drilled channels 21, 22, 23, and maintains the helical grooves such as 10a, 10b, 14a, 14b continuously filled with liquid. If screw 19 is moving any object, such as a machine tool table, then the thrust will cause the running clearance to be taken up either at 10b or at 14b, according to the thrust direction, and the helical groove at the other point will be correspondingly larger but will nevertheless be filled with liquid.

A check valve 24 continuously prevents return flow of oil to the pipe 20 and the oil in the helical grooves can only escape by following outwardly along the restricted helical paths to end of the nut. Due to the incompressible nature of the liquid and to the friction of the liquid in the helical passages such escape is sufficiently slow even under heavy pressure or reversal of pressure to avoid damage or sudden movement such as might otherwise be caused, for example by reversal of thrust in climb-cutting in a milling machine, and more than sufficient to damp out any vibratory movement or chatter, particularly since each half cycle of chatter or vibration will draw in more liquid through the check valve to oppose the next half cycle in opposite direction.

The device just described is operative to eliminate backlash, but only while a sufficiently close fit is maintained between the screw and nut threads. The device of Fig. 2 will operate to eliminate backlash substantially independently of the fit of the screw and nut parts, and without necessity for frequent adjustment of the running clearance, as follows:

A rotatable feed screw 25 engages two nut portions 26, 27 each closely slidably fitted in a bore 28 of a support 29, the nut portions being each prevented from rotating by slidably fitted keys such as 30, 31. Rigidly fixed in bore 28 by the means of locking pins 32, 32, there is a sleeve 33, the nut portions 26, 27 respectively having end portions 26a, 27a closely slidably fitted in the bore 33a of the sleeve. The construction provides annular chambers 34, 35 respectively between the different nut portions and the opposite ends of the fixed sleeve 33. Liquid, such for example as lubricating oil, from a suitable pressure source is continuously fed to the different chambers 34, 35 respectively through check valves 36, 37, through a pipe channel 38, drilled channels 39, 40, an annular groove 41 and drilled channels 42, 43, but cannot escape from the chambers except either along the periphery of the closely fitted bushings in the support bore 28, or along the closely fitted periphery of the bushing ends in the sleeve bore 33a.

The nut portion 26 is provided with a fixed head 26b and the nut portion 27 with an adjusting nut 44, threaded on nut portion 27 and locked in adjusted position by a screw 45. When the device is initially adjusted the nut 44 is adjusted until the head portion 26b and the adjusting nut 44 are closely abutting the support 29 and there is only running clearance between the threads of feed screw 25 and nut portions 26, 27, as previously described for screw 19. The nut portion 44 is then locked in adjusted position by screw 45.

During use of the device of Fig. 2 the liquid fills the chambers 34, 35 and urges both of the nut portions 26, 27 outwardly. Any thrust on screw 25 seats either the head 26b or the nut 44 solidly against the support to receive the thrust, and the other one of these parts moves outwardly by reason of the pressure of the liquid until such movement has taken up all lost motion on the screw and also taken up all lost motion of the nut means relative to the support. A reversal of thrust cannot reversely shift the parts until some of the liquid has been displaced from behind the nut portion previously moved outwardly. Such displacement can only proceed very slowly through the closely fitted sliding bores, and the resulting slow reverse movement of the part previously moved outwardly prevents vibration, chatter or overrun. Moreover, upon any increment of such inward yielding of one nut portion the slack or clearance on the screw is instantly taken up by outward movement of the other nut portion, which is not limited to slow movement but may move rapidly, whereby the device never has any lost motion, either between the screw and the nut means, or between the nut means and the support, no matter how sudden may be the reversal of thrust.

Thus, if it be assumed, for example, that the thrust on screw 25 tends to move the screw axially in the direction of the arrow there shown, then the screw threads will thrust against the threads of nut portion 26 until the head 26b is solidly abutting the right-hand end of the support 29. The screw threads will then be contacting the nut threads as at 26c, Fig. 2, and there will then be clearance or lost motion between the screw threads and nut threads at the other side of the screw thread as indicated at 26d. The device of Fig. 2 is intended to prevent the screw from moving back through such lost motion or clearance space in a manner to prevent chatter or overrun. The screw having been shifted to the left, as described, the nut portion 27 will be shifted to the left by the fluid flow into chamber 34 until prevented from further movement by contact of the nut threads against the screw threads, as at 27c, and in this position of nut portion 27 the screw cannot move to the right, even if the thrust load is reversed, until sufficient time has elapsed for some of the incompressible liquid to flow out of the chamber 34 along the closely fitted nut bearings in the bore of support 29 and of sleeve 33. Such reverse movement, if it takes place, will be at relatively very slow rate, sufficiently slow to prevent chatter or overrun. It will be understood that, in the opposite direction of normal load thrust on screw 25 it will be the nut portion 27 which transmits the normal thrust to the support 29 and the nut portion 26 which moves outwardly to prevent backlash caused by reversal of thrust, but otherwise the action will be as described. It will also be understood that the clearances shown in the drawing are, for clearness, considerably exaggerated.

If desired, the chambers 34, 35 may each be provided with air bleeder devices, such as the small-bore tubes 46, 47, but since the construction and operation of such devices are well known, it will not be necessary to explain the bleeders in detail. Any gas in the chambers 34, 35 would provide resiliency detrimental to operation of the device but ordinarily the gas will be continuously released through the closely fitted sliding joints.

It is to be noted that, while the nut portion 10 of the device of Fig. 1 is here shown rigidly fixed with its support by the means of the pin 13, such nut portion may instead be slidably mounted and keyed, similarly to the nut portions 26, 27 of the device of Fig. 2. In such case the device of Fig. 1 will operate in the manner previously described but with a certain degree of automatic take-up of lost motion effected by the axial movement of the nut portion 10, as will be understood from the description of the operation of the device of Fig. 2.

In the device of Fig. 3 a table screw 48 is suitably non-rotatably supported and nut portions 26, 27, exactly similar to the correspondingly numbered nut portions previously described, are rotatable with a sleeve 49 in a suitable bore in a support 50. Sleeve 49 may be driven from any suitable transmission, not shown, through a gear 51 which in this instance is formed integral with the sleeve. At the other end of the sleeve 49 there is an adjusting nut 52 which may be adjusted to take out all axial lost motion between the sleeve and the support, there being anti-friction thrust bearings 53, 54 to take the sleeve thrust respectively in opposite directions. As may be readily seen from the drawing, except that the nuts are rotary and the screw stationary, the device operates in exactly the same manner as has been previously described for the device of Fig. 2 for the elimination of backlash, etc., the liquid for acting on ends of the nut portions in this case being supplied from the pipe channel 55, and passing through the wall of rotary sleeve 49 through an annular groove 49a and a drilled hole 49b.

It is to be noted that, irrespective of the load, the outward pressure on the nut portions of Figs. 2, 3 need not be high in order for the device to operate to substantially eliminate backlash. The load thrust in either direction is taken against the fixed abutment of the housing, and the purpose of the outward pressure on the nuts is only to take up the clearance to prevent backlash. The device therefore operates suitably for manual operation as well as for cutting and quick traverse movement and is subject to very little wear, particularly by reason of the lubrication through continuous leakage of liquid to lubricate the screw. But if the liquid pressure is not sufficient to insure forcing the nut portions outwardly to the limit of their axial movement, such pressure should be supplied by other means, as for example by suitable springs, not shown. In such case the low pressure liquid will still operate to prevent backlash, chatter and overrun, as described.

In each of the modifications here shown the structure operates to provide a primary abutment means impositively resisting the thrust and displacement of the screw and nut means relative to the support and comprising a body of liquid confined to restrict leakage to a relatively slow rate, the primary abutment means operating to automatically take up any lost motion relative to the support. Supplementing the primary abutment means there is, in each instance, a secondary abutment means acting to positively limit the movement relative to the support, following a relatively small amount of leakage from the body of confined liquid.

It will be noted that the devices described are operative to eliminate backlash without objectionable friction even where the lead screw has become considerably more worn in some axial portions than in others, the mechanism accommodating itself without difficulty to such variations.

What is claimed is:

1. In a means for reducing or eliminating backlash between two machine elements the combination of members relatively movable in accordance with backlash between said elements to increase the volume of a restricted space, means for supply of liquid to said space, and means preventing escape of liquid from said space except at a relatively slow rate.

2. A backlash eliminator for machine mechanism including two members relatively movable in accordance with the backlash in said mechanism to increase the volume of a restricted space, a source of pressure liquid, means substantially freely admitting liquid from said source to said space, and restricting means limiting outflow of liquid from said space to a relatively slow rate.

3. The combination of a feed screw, nut means therefor including two nut portions relatively adjustable for eliminating backlash of the nut means relative to said screw, means operative for the relative adjustment of said nut portions in the direction eliminating backlash, and means subsequently operative to permit reverse direction of movement of the adjusted nut portion while restricting the rate thereof.

4. The combination of a feed screw, nut means therefor including two nut portions relatively adjustable for eliminating backlash of the nut means relative to said screw, means operative for said relative adjustment of the nut portions in the direction eliminating backlash including a piston, a cylinder and a liquid supply source therefor, and means subsequently operative to limit the rate of reverse adjustment of the adjusted nut portion including a restricted outlet for liquid from said cylinder.

5. The combination of a feed screw, nut means therefor including two nut portions relatively axially adjustable, the threads of one of said nut portions contacting the screw threads at the one side thereof to prevent relative movement therebetween in one axial direction, means operative to axially relatively adjust said nut portions until the threads of the other nut portion contact said screw threads at the other side thereof, and means subsequently operative to permit the reverse direction of adjustment of the adjusted nut portion while restricting the rate thereof.

6. The combination of a feed screw for relative support movement, nut means for said feed screw including two nut portions relatively axially adjustable, means operative to axially relatively adjust said nut portions until the nut thread elements of the different nut portions respectively contact the screw threads on opposite axial sides thereof, and means subsequently operative to permit reverse direction of adjustment of the adjusted nut portion but only at restricted rate.

7. The combination of a feed screw, nut means therefor including two nut portions relatively axially adjustable, the threads of one of said nut portions contacting the screw threads at the one side thereof to prevent relative movement therebetween in one axial direction, means operative to axially relatively adjust said nut portions until the threads of the other nut portion contact said screw threads at the other side thereof, and means subsequently operative to permit the reverse direction of adjustment of the adjusted nut portion including piston and cylinder means having a restricted outlet limiting the rate of said reverse adjustment.

8. The combination of a feed screw, a support, nut means for said screw including a first nut portion, positive abutment means for said support and first nut portion limiting the relative movement therebetween in one direction axially of said screw, said nut means including a second nut portion movable in said direction, whereby to simultaneously eliminate lost motion between said nut means and said screw and between said abutment means, means for movement of said second nut portion in said direction to effect said lost motion elimination, and means subsequently operative to permit opposite movement of said second nut portion while restricting the rate thereof.

9. The combination of a feed screw, a support, nut means for said screw including a first nut portion, positive abutment means for said support and first nut portion limiting the relative movement therebetween in one direction axially of said screw, said nut means including a second nut portion movable in said direction, whereby to simultaneously eliminate lost motion between said nut means and said screw and between said abutment means, means for movement of said second nut portion in said direction to effect said lost motion elimination, and means subsequently operative to permit the opposite movement of said second nut portion including piston and cylinder means having outlet restricting means limiting the rate of said opposite movements.

10. The combination of a feed screw, a support, nut means for said screw including first and second nut portions relatively movable for elimination of lost motion between the screw and the nut means, a support, positive abutment means, said support and first nut portion limiting said movement of the first nut portion in one direction, said support and second nut portion providing positive abutment means limiting said movement of the second nut portion in the other direction, means for movement of each of said nut portions in a direction to separate the associated abutment means, and means subsequently permitting the opposite direction of movement of each of said nut portions while restricting the rate thereof.

11. The combination of a feed screw, a support, nut means for said screw including first and second nut portions relatively movable for elimination of lost motion between the screw and the nut means, a support, said support and first nut portion providing positive abutment means limiting said movement of the first nut portion in one direction, said support and second nut portion providing positive abutment means limiting said movement of the second nut portion in the other direction, means for movement of each of said nut portions in a direction to separate the associated abutment means, and means subsequently operative to permit the opposite direction of movement of each of said nut portions including for each nut portion piston and cylinder means having outlet restricting means limiting the rate of said opposite direction of movement.

12. The combination of a support providing a bore, a feed screw extending in said bore, nut means for said screw including first and second nut portions each slidable in said bore and spaced apart axially, said nut portions being relatively axially movable to eliminate axial lost motion between said nut means and said screw, means simultaneously urging each of said nut portions in a direction to eliminate said lost motion, and means permitting movement of each of said nut portions in the opposite direction while restricting the rate of such opposite movement.

13. The combination of a support providing a bore, a feed screw extending in said bore, nut means for said screw including first and second nut portions each slidable in said bore and spaced apart axially, said nut portions being relatively axially movable to eliminate axial lost motion between said nut means and said screw, means simultaneously urging each of said nut portions in a direction to eliminate said lost motion, means permitting movement of each of said nut portions in the opposite direction while restricting the rate thereof, and means limiting the amount of said opposite movement of at least one of said nut portions relative to said support.

14. The combination of a support providing a bore, a feed screw extending in said bore, nut means for said screw including first and second nut portions each slidable in said bore and spaced apart axially, said nut portions being relatively axially movable to eliminate axial lost motion between said nut means and said screw, means simultaneously urging each of said nut portions in a direction to eliminate said lost motion, means permitting movement of each of said nut portions in the opposite direction including for each nut portion piston and cylinder means having outlet restricting means limiting the rate of movement in said opposite direction, and positive abutment means limiting the amount of said opposite movement of at least one of said nut portions relative to said support.

15. In a machine tool having a support, and thrust means including screw and nut means associated with the support, the combination of thrust abutment means including primary abutment means comprising a body of liquid opposing relative movement of said support and said screw and nut means and confined to restrict the rate of leakage thereof, and supplemental abutment means including said support and adapted to operate as a positive abutment opposing movement of said screw and nut means relative to said support after leakage of liquid from the body of liquid of said primary abutment means.

16. In a machine tool having a support, and thrust means including screw and nut means associated with the support, the combination of thrust abutment means including, for each of opposite directions of thrust of said screw and nut means, a primary abutment means comprising a body of liquid opposing relative movement of said support and said screw and nut means and confined to restrict the rate of leakage thereof and supplemental abutment means including said support and adapted to operate as a positive abutment opposing movement of said screw and nut means relative to said support after leakage of liquid from said confined body of liquid.

FRED A. PARSONS.

CERTIFICATE OF CORRECTION.

Patent No. 2,195,799. April 2, 1940.

FRED A. PARSONS.

It is hereby certified that error appears in the printed specification of the above numbered patent requiring correction as follows: Page 4, first column, line 29, claim 10, for the word and comma "means," read --means for--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.